United States Patent [19]

Stoilov

[11] Patent Number: 4,625,387

[45] Date of Patent: Dec. 2, 1986

[54] CUTTING MACHINE WITH AUTOMATIC CHANGING OF TOOLS AND TOOL MAGAZINES

[75] Inventor: Nikola D. Stoilov, Sofia, Bulgaria

[73] Assignee: Institute za Metalorejeshti Mashini, Sofia, Bulgaria

[21] Appl. No.: 667,910

[22] Filed: Nov. 2, 1984

[30] Foreign Application Priority Data

Nov. 3, 1983 [BG] Bulgaria .................................. 62913

[51] Int. Cl.$^4$ .......................................... B23Q 3/157
[52] U.S. Cl. ..................................................... 29/568
[58] Field of Search ............ 29/568, 26 A, 563, 33 D

[56] References Cited

U.S. PATENT DOCUMENTS 3,868,763 3/1975 Sato ........................................ 29/568
4,240,194 12/1980 Inami et al. ............................ 29/568
4,288,192 9/1981 Geiger et al. ...................... 29/568 X

FOREIGN PATENT DOCUMENTS 0031576 3/1980 Japan ..................................... 29/568
0201147 12/1982 Japan ..................................... 29/568

Primary Examiner—Z. R. Bilinsky

[57] ABSTRACT

A cutting machine with automatic changing of tools and tool magazines comprising a fixed body with spindle. On the body is mounted longitudinally a mobile compound cross slide and a transversely mobile column thereon. Behind the body there is mounted a tool magazine storing station; each magazine is composed of seats with axes that lie in a plane parallel to the spindle. During operation of the machine, one of the tool magazines is fastened to the compound slide through a magazine receiving station. The remaining magazines are housed in respective cells of the tool magazine storing station. Each magazine has a gear for driving the seats that meshes with the shaft of a motor, which is fixed to the magazine receiving station. The cutting machine is generally of the type with rotating tools and is used in the metal processing industry.

10 Claims, 9 Drawing Figures

F I G. 7
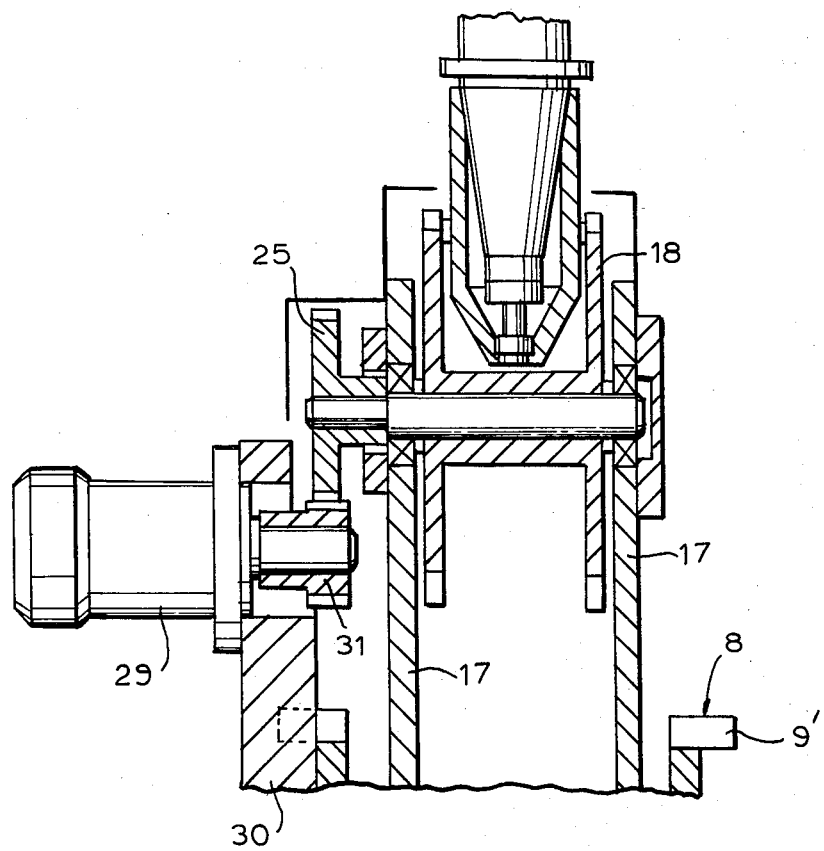

CUTTING MACHINE WITH AUTOMATIC CHANGING OF TOOLS AND TOOL MAGAZINES

This invention relates to a cutting machine with automatic changing of tools and tool magazines, in particular to a cutting machine with rotating tools.

A known cutting machine, disclosed in U.S. Pat. No. 4,240,194, with automatic changing of tools and tool magazines has a fixed body with a spindle. Disposed upon the body there is a longitudinally movable slide on which there is supported a transversely movable column. Behind the fixed body of the machine there is disposed a stack of tool magazines. Each tool magazine is composed of a plurality of seats or sockets. An auto-operator may be employed for changing of tools at each cutting machine.

In such known cutting machine, the tool magazines are round in shape and the tools are disposed perpendicularly to their plane and at the same time they are perpendicular to the spindle of the cutting machine. One of the tool magazines is fastened to the column of the machine, while the others of the tool magazines are disposed in cells in a tool magazine containing station that is disposed behind the machine. The distance between two adjacent tool magazines in the tool magazine station is at least equal to the maximum permissible length of the tools and a free space for permitting the extracting of the tail end of the tools from the seats or receptacles in the tool magazine.

The great distance between the cells in the tool magazine station is one of the essential drawbacks of such known machine because it leads to:

a great length of the tool magazine station;

a large travel stroke of the carriage under the column in order to reach each tool magazine of the tool magazine storing station;

the machine is made more expensive because of the necessity of having a long tool magazine station, a long body, and a large surface occupied by the machine and its tool storing and changing mechanism.

A second shortcoming of the above-described prior art machine is that the rolls by means of which each tool magazine is transferred from the machine to the tool magazine station or vice versa are disposed at one side of the tool magazine station. The weight of the tool magazine and of the tools is carried in a cantilever manner with respect to the rolls. As a result, the guide bars must bear not only the weigh of the tool magazine and the tools carried thereby, but also must sustain a large torsion moment. This requires the use of guiding beams as well as the employment of large guiding rolls for each tool magazine.

A third shortcoming of the above-described prior art machine and its tool storing and changing mechanism is the complication of the auto-operator for tool changing, since it is necessary to carry out an additional movement—rotating each tool through 90° after its extraction from the tool magazine, in order that the tool axis becomes parallel to the axis of the spindle.

The present invention has among its objects the provision of a cutting machine with automatic changing of tools and tool magazines that has a compact storage of tool magazines, and insures a stable, reliable guiding of the tool magazines during their transfer from the tool magazine station to the slide of the cutting machine, and vice versa.

The above objects are attained by a cutting machine with automatic changing of tools and tool magazines comprising a fixed body with a spindle. On the body there is disposed a movable cross slide, and on the slide there is mounted a transversely movable column. In front of the fixed body there is disposed a work table. Behind the fixed body there is mounted a tool magazine receiving station. Each tool magazine is composed of sockets or seats with central axes. In accordance with the invention, the axes of the seats lie in a plane parallel to the spindle of the machine, while one of the tool magazines is fastened to the cross carriage by means of a receiving station, and the remaining tool magazines are fixed in respective cells of the tool magazine receiving station.

Each tool magazine has an outwardly protruding gear for driving or indexing the seats, said gear meshing with a pinion on the shaft of a motor that is fastened in a fixed manner to the receiving station, there being several supports with rolls for shifting the tool magazine along guiding bars by means of a mechanism attached to the receiving station. In the front end of the receiving station there are fastened two mechanisms to fix the tool receiving receptacles or seats while they are being changed, as well as two contactless change-over switches for counting the seats during their indexing movement. In the rear end of the receiving station there is mounted a fixator body the tip of which is disposed in their respective opening of a plate, that is fastened in a fixed manner to the tool magazine. The receiving station and cells of the tool magazine station have a U-shaped transverse section.

The advantage of the invention is that the tool magazine station is compact and has a stable guiding means, thus enlarging the functional capabilities of the cutting machine.

A preferred example of the apparatus of this invention is illustrated herein in the accompanying drawings, wherein:

FIG. 7 is a fragmentary view in vertical section through the portion of the machine shown in the circle B in FIG. 2, the section being taken along the line 7—7 in FIG. 5;

Figure 1:
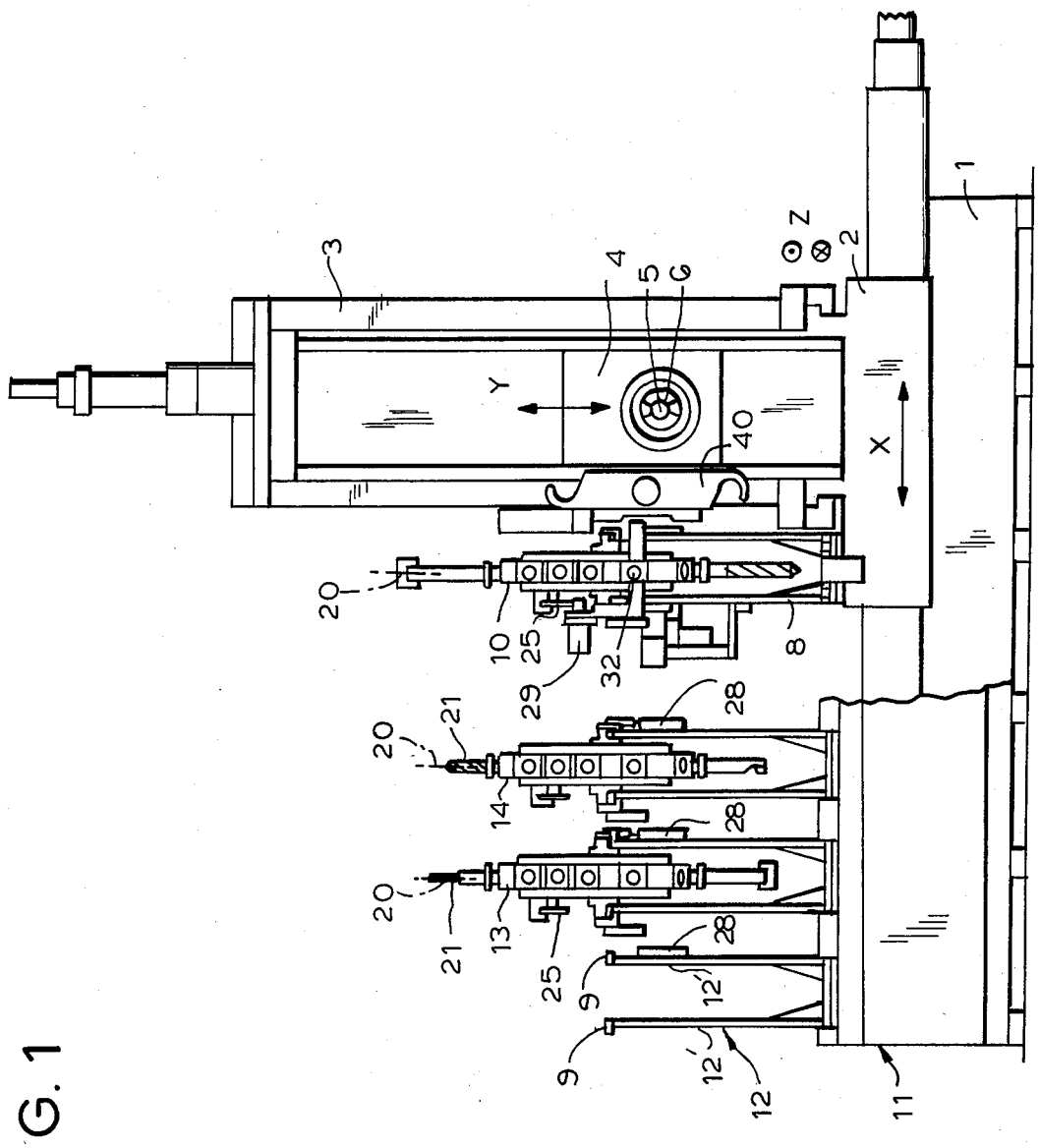
FIG. 1 is a general view in front elevation of the cutting machine, the workpiece supporting or operation table of the machine being omitted in this figure.
Figure 2:
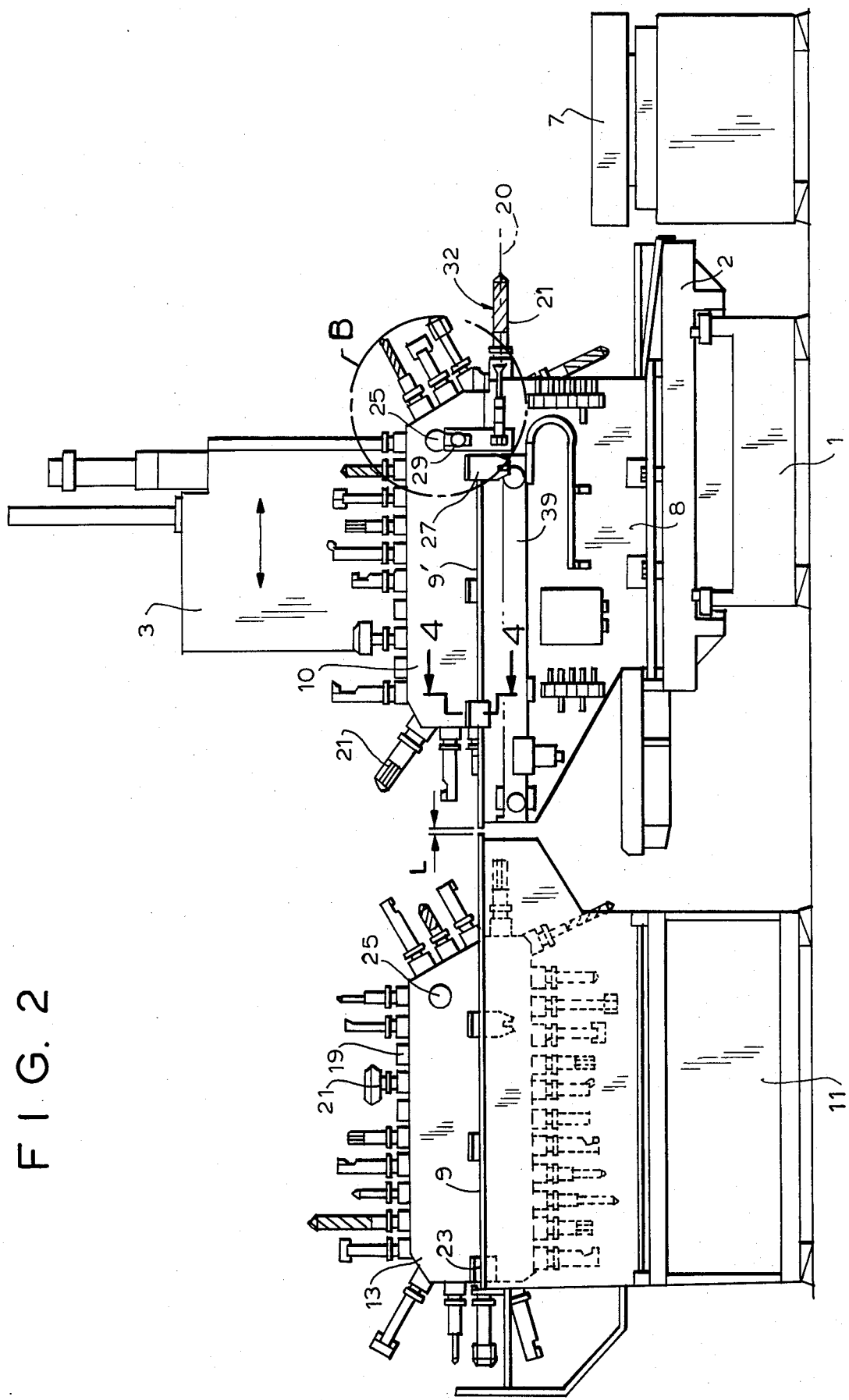
FIG. 2 is a view in lateral elevation of the machine of FIG. 1, the view being taken in the direction from left to right in FIG. 1, the work supporting operation table being shown in FIG. 2.
Figure 3:
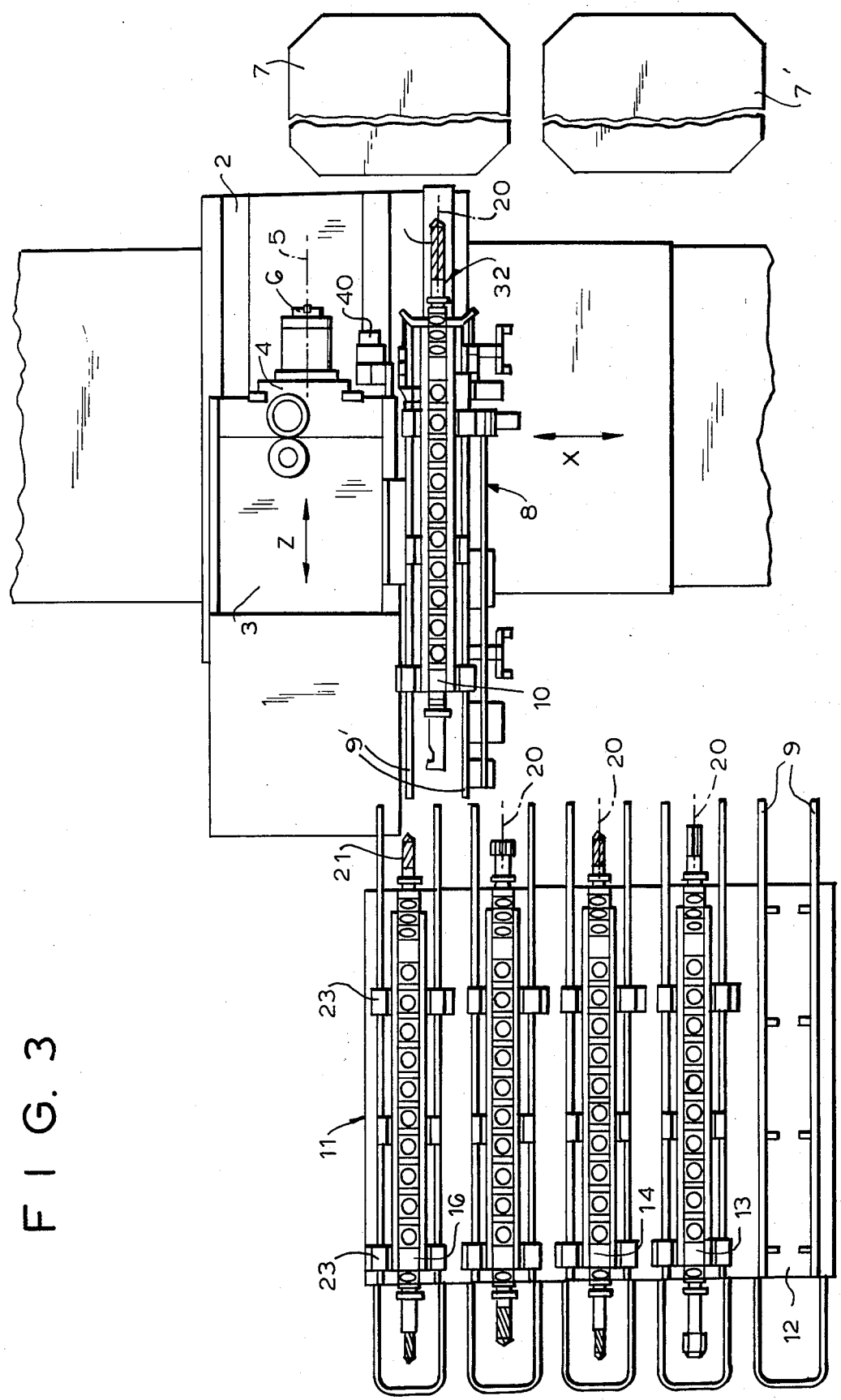
FIG. 3 is a top plan view of the apparatus of the invention with the parts in the position thereof shown in FIGS. 1 and 2, two alternatively used workpiece supporting operation tables being shown in FIG. 3.

Turning first to FIGS. 1, 2, and 3, the cutting machine shown therein comprises a fixed body 1, on which there is disposed a longitudinally movable compound cross slide 2, which is movable along the axis X, and a transversely movable column 3 which is mounted upon slide 2 and movable along the axis Z. Upon the transversely movable column 3 there is mounted a vertically movable spindle headstock 4 which is movable along the axis Y. Headstock 4 has a spindle 6 with a horizontal axis 5. As shown in FIG. 3, the machine is provided with two alternatively used workpiece supporting operation tables 7, 7', disposed side by side, with which the tool mounted upon the spindle 6 can selectively cooperate. The operation tables 7, 7' may be immovable, or may be provided with mechanisms where they are capable of rotary movement. In addition, such tables may be of different shapes.

In the positions of the parts shown in FIGS. 1, 2, and 3, a tool receiving cell of receiving station 8 having a U-shaped section fixedly connected to the compound slide 2 of the machine. In the upper ends of the legs of the U-shaped tool receiving station 8 there are fixed guiding bars 9' on which is disposed a tool magazine 10. Behind (to the left of) the compound slide 2 there is fixedly mounted the base of a tool magazine station 11 which in this case contains five cells 12, 13, 14, 15, and 16 for receiving the tool magazines. All of the cells have the same U-shape as cell 10 in the receiving station 8. Between the receiving station 8 and the cells 12–16, inclusive, there is a small space or play "L". The cell 12 which selectively receives the tool magazine 10 is empty in FIGS. 1 and 3 while in the remaining cells 13–16 there are disposed tool magazines similar to magazine 10.

Figure 5:
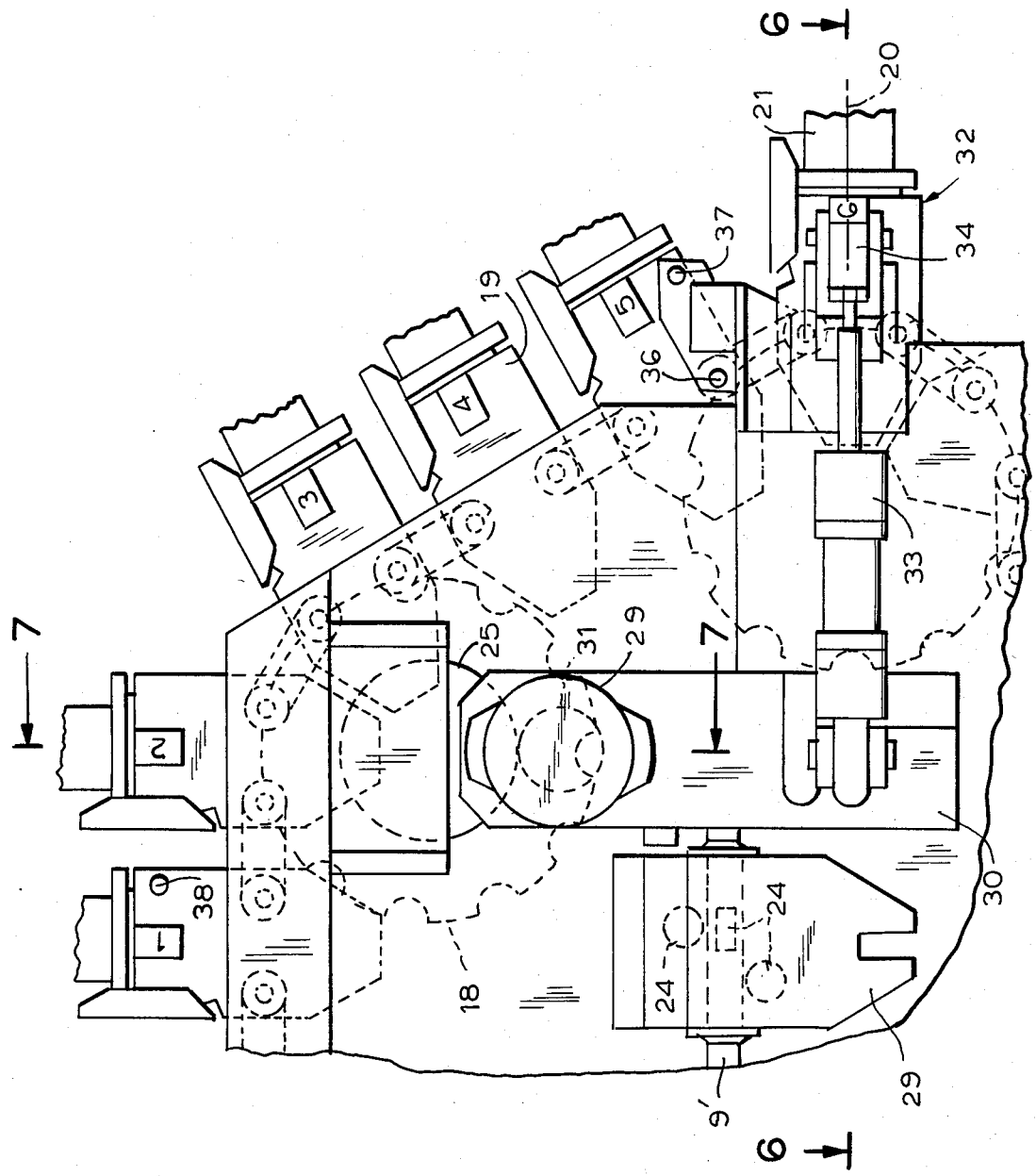
FIG. 5 is a view on an enlarged scale of the portion of the machine shown within the circle B in FIG. 2.
Figure 6:
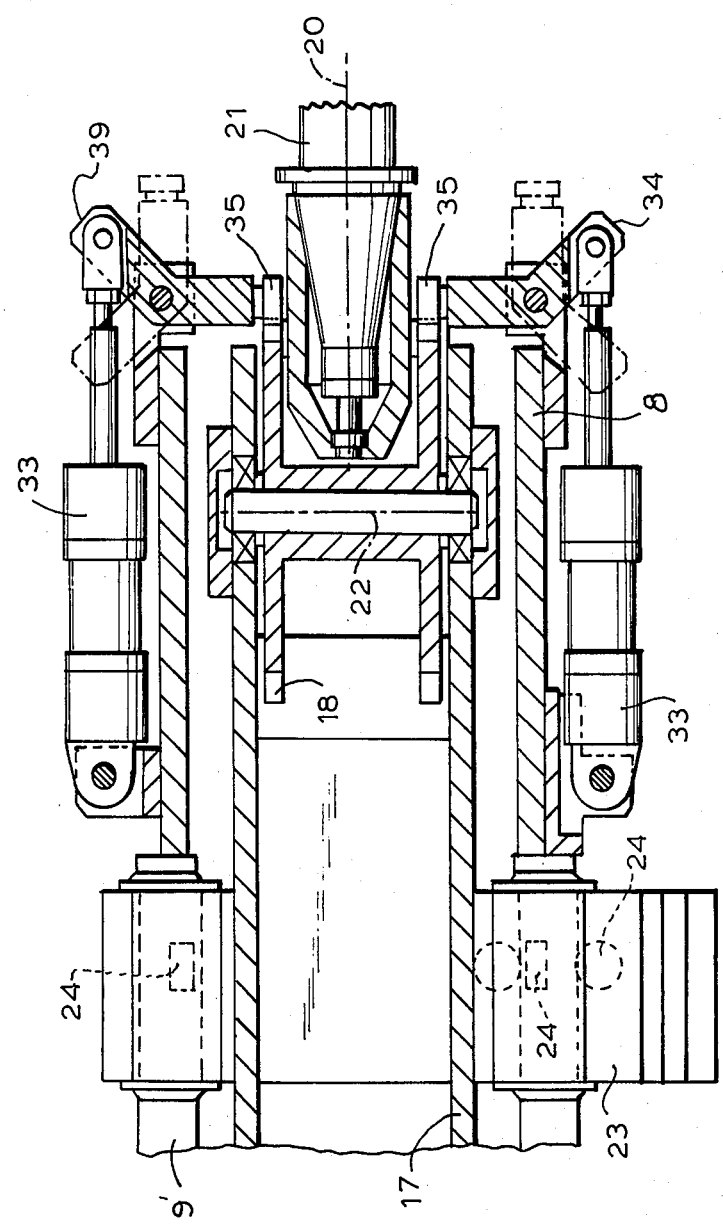
FIG. 6 is a view in horizontal section through the machine of the invention, the section being taken along the line 6—6 in FIG. 5.

Each of the tool magazines consists of a body 17, sprockets 18, and a chain (FIG. 5) forming serially connected seats or receptacles 19. The construction of body 17 and of the chain, as well as the number of the sprockets are not the subject of this invention. The tool magazines can also have a round shape. The seats or receptacles 19 have axes 20 which coincide with axes of the tools 21 received there within. These axes 20 are perpendicular to the axes 22 of the sprockets or to the axes of the tool magazines. It is necessary that the tool magazines are tight, and are arranged in the tool magazine station very compactly.

Axes 20 of seats 19 of each tool magazine lie in a plane that is parallel to the horizontal axis 5 of spindle 6. Several supports 23 are affixed to body 17 of the tool magazines, rolls 24 being mounted upon the supports 23. By means of rolls 24, each tool magazine travels along the guiding bar means 9' of the receiving station 8 or guide means 9 of the cells of tool magazine receiving station mounted on base 11, and can easily be transferred from one to the other and vice versa.

Each tool magazine has a gear 25 protruding outside the body 17 thereof, gear 25 being fixed to the shaft of one of the sprockets 18. Each tool magazine also has a fixing plate 26 as well as a bracket 27 for being connected with mechanism for transferring the tool magazine.

Figure 4:
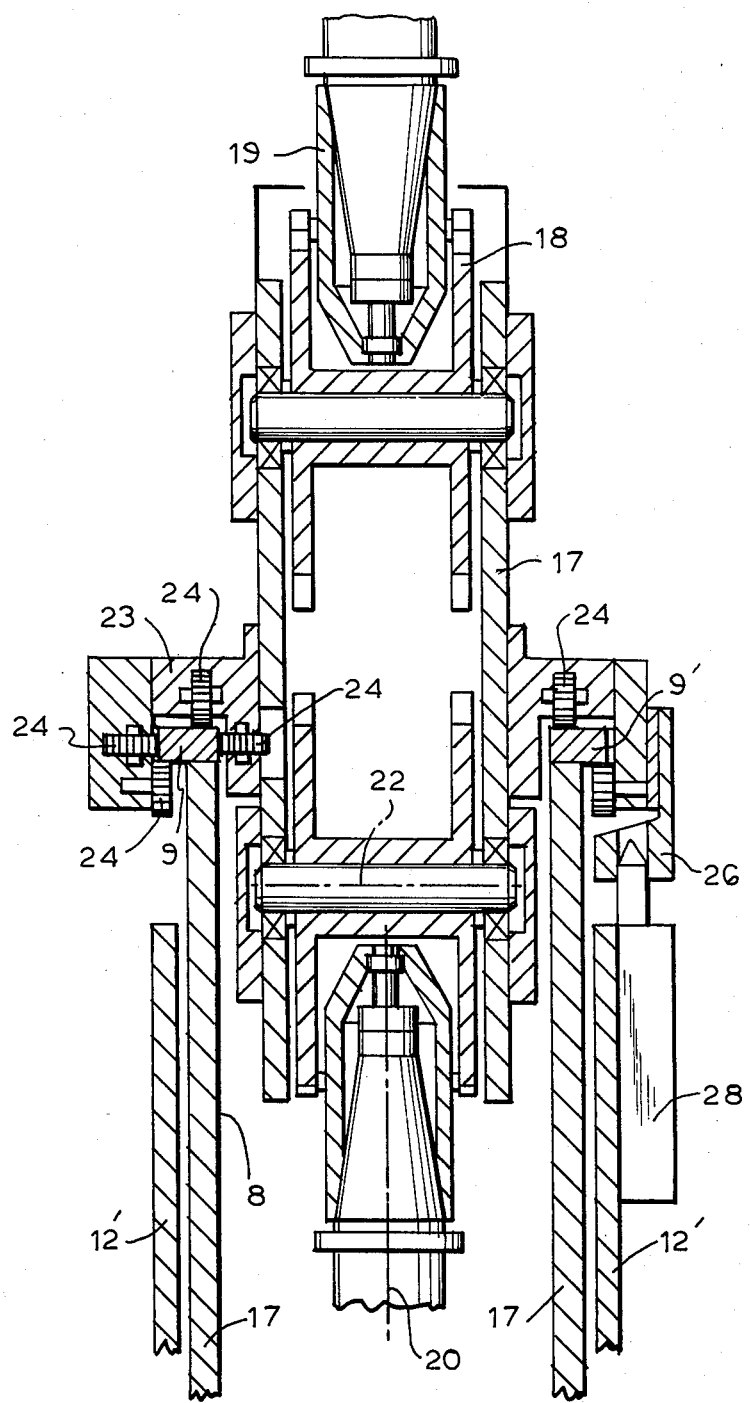
FIG. 4 is a fragmentary view in vertical cross section, such section being taken along the line 4—4 in FIG. 2.

To each cell of the tool magazine station 11, and on the cell of the receiving station 8, there is fastened a fixture 28 (one to each) the end parts of which are disposed in the fixing plate 26 of the respective tool magazine (FIG. 4). The body of a motor 29 is affixed to receiving station 8 by means of plate 30. A gear 31 is fastened to the shaft of motor 29. The motor 29 is so fastened to plate 30 that its gear 31 is constantly in mesh with the gear 25 of the tool magazine 10 which is fixed in the receiving station 8. Thus by the rotation of the shaft of the motor 29 each seat 19 of the tool magazine 10 can be selectively placed into a position known as the tool changing position 32. The axis 20 of seat 19 which is in the tool changing position 32 is parallel to the horizontal axis of spindle 6 of the cutting machine. In order to fix the seat 19 in this position there is provided with a selectively lockable escapement having two fixing mechanisms, fastened to both external walls of the U-shaped receiving station 8. Each fixing mechanism consists of a rocking cylinder 33, to the piston rod of which there is fastened a rocker 34 carrying two rolls 35 at its other end. Rolls 35 are thus selectively brought into locking engagement with the teeth 35 of a sprocket.

In the front end of receiving station 8 there are also disposed two contactless change-over switches, one of which, designated 36 (FIG. 5), counts the seats 19 of the tool magazine as they pass by and the other of which designated 37, (FIG. 5) determines the positioning of the desired seat 19. Each tool magazine has a cam 38 (FIG. 5) for acting on the other changeover switch 37.

To the external side wall of the receiving station 8 there is affixed a chain-rod mechanism 39 for transferring the tool magazines from the receiving station 8 to the tool magazine station 11 and vice versa.

To the transversely movable column 3 or to the receiving station 8 there is fastened a mechanical hand 40, that is, an auto-operator, for changing tools between spindle 6 and the tool changing position 32.

The above-described cutting machine in the automatic tool changing mechanism associated therewith operates as follows: During the machine's operation with the "previous" (first) tool disposed in spindle 6, the cylinder 33 and the motor 29 are energized in order to retrieve the "new" (second) or following tool of the machining program. The rotary movement of motor 29, acting through gears 31, 25 and the sprocket 18 drives the chain made up of a series of seats 19. This movement of the chain continues until the requested, second, seat 19 reaches the tool changing position 32. The rotation of motor 29 has stopped, and the cylinders 33 are energized to lock the chain of the magazine. The "new" tool prepared in this matter waits in the tool changing position 32 until the end of the machine operation conducted with the "previous" tool. Then follows the transfers of the transverse movable column 3 along axis Z, and the movement of the spindle headstock 4 along axis Y, until the spindle 6 occupies the tool changing position 32. The mechanical hand 40 rotates and grips the "previous" and the "new" tools. By a forward translation movement, this hand extracts the tools respectively from the front of the spindle 6 and from the front seat 19. The mechanical hand 40 now rotates through a 180°, returning to its initial position. The "new" tool is now in spindle 6. A new machining operation using the "new" tool now begins.

Figure 8:
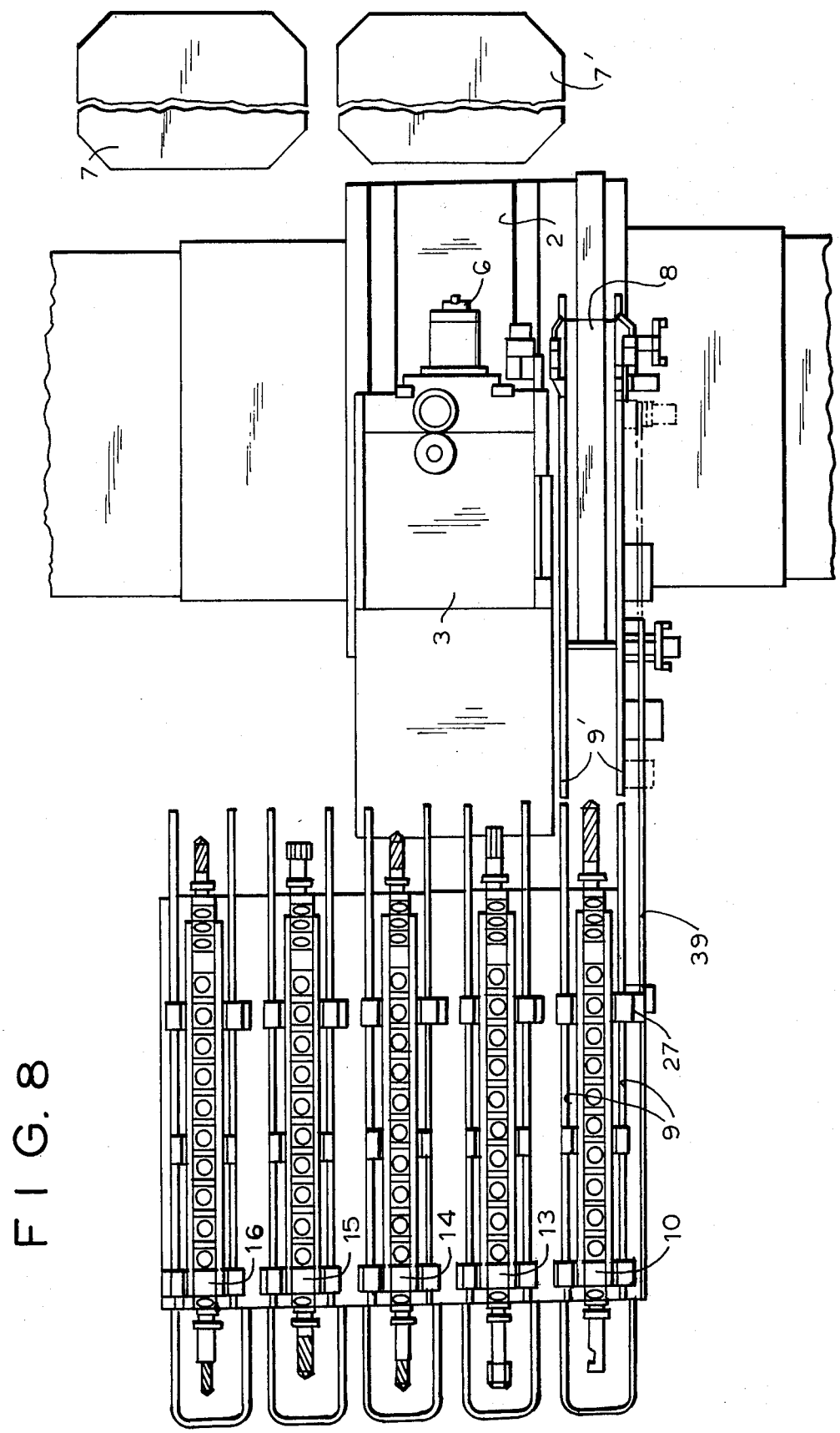
FIG. 8 is a top plan view of the machine, the first or bottom (FIGS. 3 and 8) tool magazine having been returned to the tool magazine station.

On the termination of the programmed operations using tools from the first tool magazine 10, there is emitted a signal for the changing of the tool magazines. The cross slide 2 is then transferred (down in FIG. 3) along axis X and moves until the receiving station 8 takes its place in front of the empty cell 12 destined to receive the tool magazine 10 (FIG. 8). During this shifting, the mechanical hand 40 returns the last tool from the spindle 6 to an empty seat 19, which beforehand has been positioned fixedly in tool changing position 32.

The spindle 6 is already free, and is waiting for tools, for example, from the second tool magazine 13.

Figure 9:
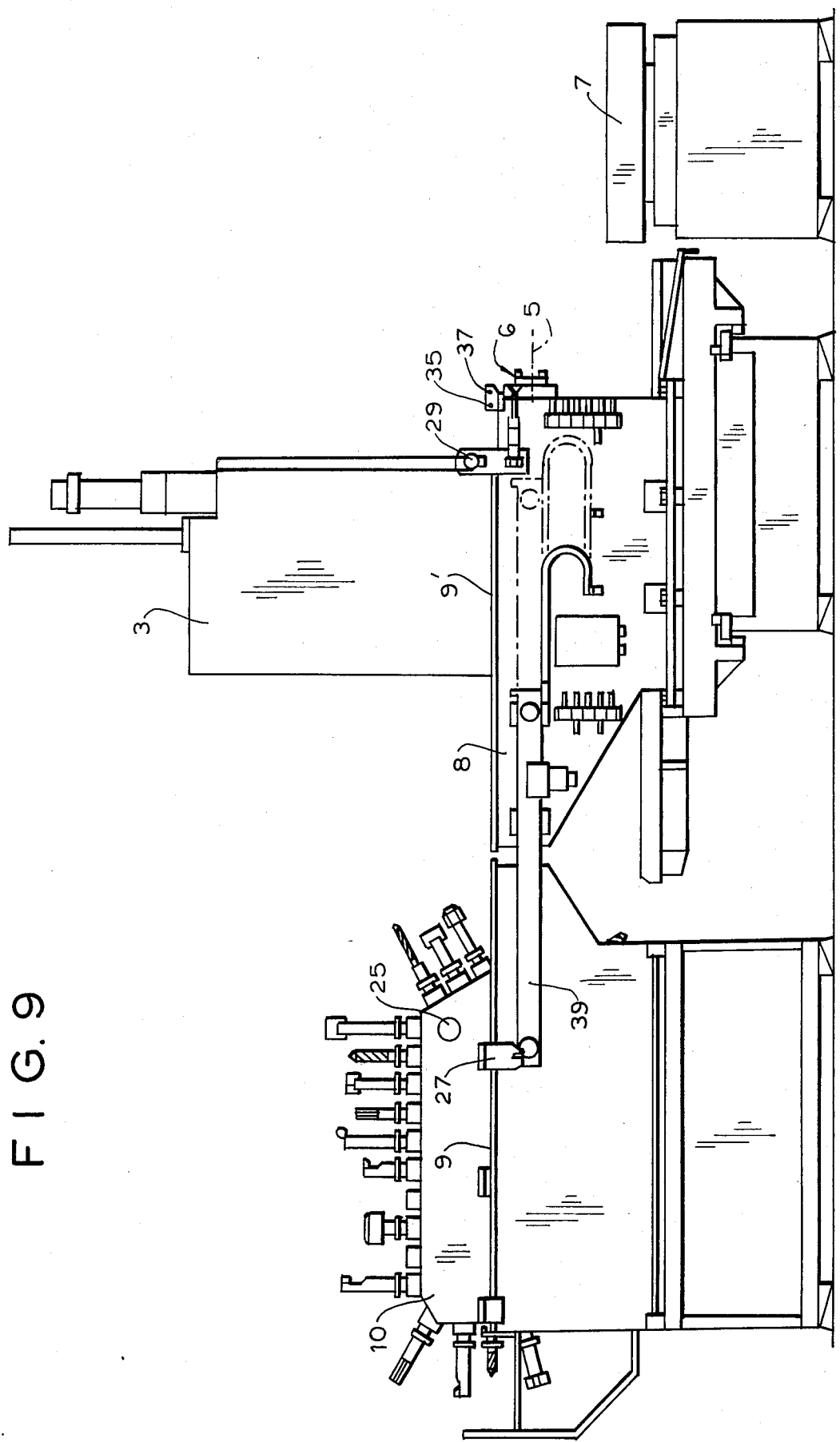
FIG. 9 is a view in side elevation of the machine with the parts thereof including the tool magazines in the positions which they occupy in FIG. 8.

After the above-described initial actions have been carried out, the cylinders 33 are energized in order to disengage the two fixtures 28 (the one that is in the receiving station 8 and the other that is in the empty cell 12). Then follows the meshing of the chain-rod mechanism 39 with the bracket 27, the shifting of the tool magazine 10 from the receiving station 8 to the empty cell 12 of the tool magazine storing station 11, the fixing of the tool magazine 10 in cell 12, and loosening of the chain-rod mechanism 39 from bracket 27 (FIG. 9). The latter now returns to the area of the receiving station 8. This terminates process of leaving the "previous" tool magazine 10, which is not further needed, in the tool magazine storing station on base 11.

In order to take the next tool magazine, for example 13, it is necessary to accomplish the following operations;

shifting the compound slide along axis X until the receiving station 8 assumes a position in front of cell 12 for the magazine 13;

idle stroke of the chain-rod mechanism 38 to the tool magazine storing station 11;

removing tool magazine 13 from its cell;

meshing of chain-rod mechanism 39 with bracket 27 of tool magazine 13, and beginning the shifting of this tool magazine from the tool magazine storing station 11 to the receiving station 8;

at this moment there is switched on the slow rotation of the motor 29 in order to facilitate the meshing of gear 29 with the gear 31;

fixing to magazine 13 the fixture 28 of the receiving station 8.

In this manner, the process of inserting a new tool magazine in receiving station 8 is ended. The tool magazine is, however, meshed with motor 29 in an arbitrary position. This imposes a fast travel of the seats 19 in order that the cam 38 of the first seat 19 is able to actuate the contactless change-over switch 37. The signal of this switch will normalize the operation of the other contactless change-over switch 36 for counting the number of seats 19 of the tool magazine which have passed. The travel of the seats in the tool magazine proceeds until the respective seat 19 reaches the tool changing position 32. This seat 19 is fixed in position by the cylinders 33; thereafter there is emitted a signal to the mechanical hand 40 for putting a tool from the new tool magazine 13 into the spindle 6.

The construction thus described of the cutting machine is presented as an example. The concept of the invention can be implemented in machines without a compound slide 2 under the column 3, for example, if the column 3 shifts only along axis Z while the movement along the axis X is affected from the one or more operating tables 7, 7'. In this case, beneath the tool magazine storing station 11 it is necessary to use a mechanism for its longitudinally transfer parallel to the axis X of the tool magazine storing station 11, so that each cell 12 of the station 11 is able to take its place behind the receiving station 8, which in this particular case is fastened directly to the immobile body 1.

Another solution can be achieved, if the rolls 24 for transfer of the tool magazine are disposed only on the one side of the body 17 of the tool magazine.

A further version of this results in the case when, instead of the gear 31 and meshing gear 25, there is employed a front clutch, etc.

Although the invention is described and illustrated with reference to a plurality of embodiments thereof, it is to be expressly understood that it is in no way limited to the disclosure of such preferred embodiments but is capable of numerous modifications within the scope of the appended claims.

I claim:

1. A cutting machine with automatic changing of tools and tool magazines, comprising a fixed body, a cross slide on the body, a column mounted on the cross slide for movement at right angles to the transverse movement of cross slide, a headstock having a tool supporting and driving spindle on said column, means for selectively moving the headstock along the length of the column transversely to the direction of movement of the cross slide and of the column on the cross slide, a workpiece supporting table position forwardly of the body, a tool magazine storing station spaced closely from the body, said tool magazine storing station having a plurality of similar cells each of which receives a respective tool carrying magazine, each magazine having a plurality of indexable tool receiving seats disposed in a plane parallel with the axis of the spindle of the machine, the machine having a tool magazine receiving station on the cross slide of the body thereof, said receiving station having a magazine receiving cell, means selectively to transfer a chosen one of said magazines from said magazine storing station to the receiving cell of the receiving station, means to actuate the tool indexing means of the tool magazine positioned in the receiving cell so as to present a predetermined desired second tool thereon to a tool changing position wherein said second tool lies in the same plane as and close to a first tool mounted on the spindle of the machine, and means to remove the first tool from the machine spindle and to transfer the second tool from the tool magazine in the receiving cell to the spindle of the machine.

2. A cutting machine according to claim 1, wherein the means for selectively transferring a chosen one of said magazines from said magazine storing station to the receiving cell also returns the said chosen one of said magazines from the receiving cell to said magazine storing station or for effecting substitution of the second tool for the first tool.

3. A cutting machine in accordance with claim 1, wherein each of the tool storing magazines comprises a plurality of tool receiving seats serially connected together in the form of a chain.

4. A cutting machine in accordance with claim 3, wherein the means to actuate the tool indexing means of the tool magazine in the receiving station comprises a motor fixedly mounted upon the receiving station, means on the magazine in the receiving station for driving the chain of tool receiving seats in the tool magazine, and means which is drivingly coupled between the motor and the chain driving means on the tool magazine when said tool magazine is positioned in the receiving station.

5. A cutting machine in accordance with claim 4, comprising means for counting the tool receiving seats of the magazine positioned in the receiving station during the actuation of the tool indexing means, and means for stopping the indexing motion of the chain of tool bearing seats and locking such chain in the position when the second, predetermined replacement tool reaches the tool changing position.

6. Cutting machine according to claim 1, characterized in that the receiving station and the cells of the tool magazine storing station have a U-shaped section.

7. A cutting machine according to claim 1, wherein the means selectively to move a chosen one of said magazines from said magazine storing station to the receiving cell of the receiving station comprises a chain-rod mechanism.

8. A cutting machine according to claim 1, wherein the tool magazines each contains a single disc-shaped row of tool receiving seats, said row of tool receiving seats being contained between two opposite magazine body walls positioned close to the respective sides of said row of tool receiving seats.

9. A cutting machine according to claim 3, wherein the means which is drivingly coupled between the motor and the chain driving means on the tool magazine when said tool magazine is positioned in the receiving station comprises a first gear protruding outside the body of the magazine, said first gear meshing with a second gear mounted on the shaft of the motor.

10. A cutting machine according to claim 3, comprising means for fixing the tool receiving seat which is in the tool changing position, said last named means comprising a sprocket and two rolls mounted on the opposite ends of a rocker for alternate engagement with respective tooth of the sprocket and for withdrawal therefrom.

* * * * *